Nov. 25, 1941.  F. L. RE QUA  2,263,853
FILTER
Filed April 10, 1939
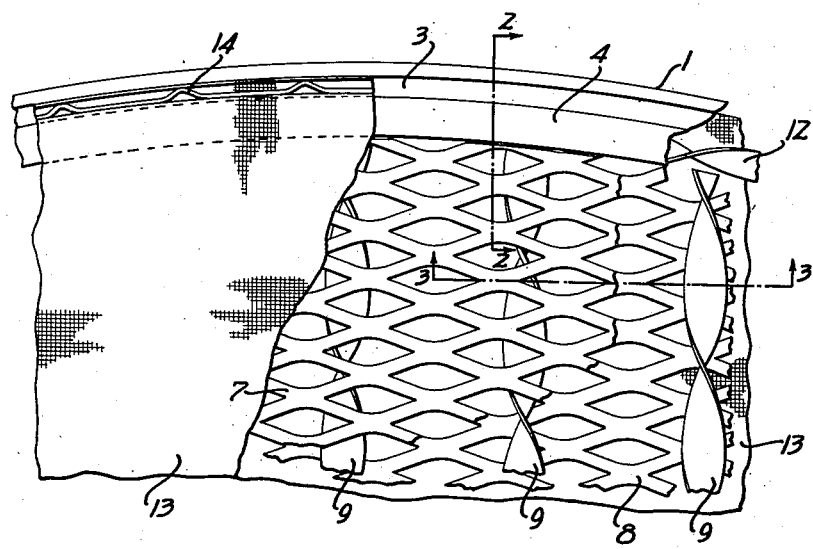
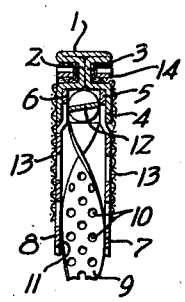
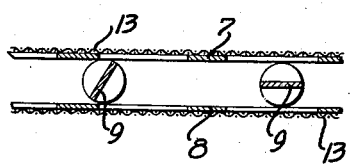
INVENTOR
FREDERICK L. RE QUA
BY
HIS ATTORNEY Patented Nov. 25, 1941

2,263,853

UNITED STATES PATENT OFFICE 2,263,853

FILTER

Frederick L. Re Qua, San Francisco, Calif., assignor to Oliver United Filters Incorporated, San Francisco, Calif., a corporation of Nevada Application April 10, 1939, Serial No. 266,986

2 Claims. (Cl. 210—195)

This invention relates in general to filters and in particular to a filtrate compartment which is rigid and durable and at the same time offers a minimum resistance to the flow of filtrate through it.

All filters consist essentially of a filter medium disposed over a chamber or compartment into which the filtrate flows after passing through the filter medium under the action of a differential pressure. The filter medium is normally carried by a supporting screen which is held in spaced relation from the backing member or floor of the filtrate compartment by a drainage member.

In general, the object of this invention is the provision of a filter in which the filter medium is supported directly or indirectly by a metal ribbon twisted about its longitudinal axis.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a fragmentary side elevation of a filter leaf embodying the objects of my invention and in which parts have been broken away to disclose the construction more clearly.

Figure 2 is a section taken on the line 2—2 of Figure 1.

Figure 3 is a section taken on the line 3—3 of Figure 1.

The filter leaf shown in these figures is of the type disclosed in the Sweetland Patent No. 1,381,944, of June 21, 1921, and comprises a circular rim 1 formed with lateral channels 2 and 3 and with an inner peripheral channel 4. Disposed within the channel 4 are inwardly offset peripheral edges 5 and 6 of a pair of supporting screens 7 and 8 formed of rolled shelf mesh. The supporting screens 7 and 8 are held in spaced parallel relation by a plurality of spaced parallel metal ribbons 9, each twisted about its longitudinal center line so as to form a spiral separator. If desired, the ribbons 9 may be formed with perforations 10 through which the filtrate may pass.

It will be noted that at points spaced along the length of each ribbon 9 the plane of the ribbon as indicated at the point 11 is at right angles to the supporting screens 7 and 8. The supporting screens may be conveniently welded to the ribbon at these spaced points by locating the electrodes of the welding machine on opposite sides of the filter leaf at these points so that the electric current will pass, for example, through the supporting screen 7 across diametrically opposed points of the ribbon 9 to the supporting screen 8. The inwardly offset peripheral edges 5 and 6 of the supporting screens 7 and 8 may be welded within the channel 4 to the rim 1 and for the purpose of preventing the lateral walls of the channel 4 from collapsing, a loop of twisted ribbon 12 may be disposed between the peripheral edges 5 and 6 before the rim 1 is disposed over these edges. Since the ribbon 12 is located between the offset peripheral edges 5 and 6, it must be of smaller width than the ribbon 9.

Covering either side of the filter leaf so formed and supported by the supporting screens 7 and 8 is a filter medium 13, the peripheral edges of which are secured within the lateral channels 2 and 3 by a crimped metal band or wire 14.

The twisted ribbon 9 is very strong for its weight, for any crushing force to which it is subjected is resisted by a through column of metal supported against collapse by the adjacent metal along its longitudinal axis. A further advantage of such a spacing member is that the two supporting screens may be simultaneously welded thereto at diametrically opposed points on the ribbon by the operation of a spot welder. Not only is a rigid and easily fabricated construction provided, but a construction which offers a minimum resistance to the passage of filtrate through the resulting leaf.

Although as shown and described, my invention has been applied to a filter of the leaf type, it may of course be applied to any type of filter including continuous filters of the rotary drum and disc type. As embodied in a rotary drum filter, the twisted metal ribbon would be disposed between the drum of the filter and the supporting member rather than between two reticulated supporting members as shown in Figures 1, 2, and 3.

I claim:

1. A filter comprising: a pair of metal supporting screens; and metal ribbon twisted along its longitudinal center line and disposed between said supporting screens for holding them in spaced relation, said ribbon being welded to said screens at diametrically opposed points along its length.

2. A filter comprising a pair of reticulated metal members held in spaced relation by a plurality of metal ribbons each twisted about its longitudinal center line and welded to said reticulated members at spaced pairs of diametrically opposed points along its edge.

FREDERICK L. RE QUA.